United States Patent
Huang et al.

(10) Patent No.: US 12,528,179 B2
(45) Date of Patent: Jan. 20, 2026

(54) HYBRID MASTER-SLAVE MAPPING METHOD, ROBOTIC ARM SYSTEM, AND COMPUTER DEVICE

(71) Applicant: NOAHTRON INTELLIGENCE MEDTECH (HANGZHOU) CO., LTD., Zhejiang (CN)

(72) Inventors: Shandeng Huang, Zhejiang (CN); Long Bai, Zhejiang (CN); Xiaohong Chen, Zhejiang (CN); Lufeng Pan, Zhejiang (CN); Jianfei Liu, Zhejiang (CN)

(73) Assignee: NOAHTRON INTELLIGENCE MEDTECH (HANGZHOU) CO., LTD., Hangzhou (CN)

( * ) Notice: Subject to any disclaimer, the term of this patent is extended or adjusted under 35 U.S.C. 154(b) by 279 days.

(21) Appl. No.: 18/269,207

(22) PCT Filed: Dec. 30, 2020

(86) PCT No.: PCT/CN2020/141175
§ 371 (c)(1),
(2) Date: Jun. 22, 2023

(87) PCT Pub. No.: WO2022/141138
PCT Pub. Date: Jul. 7, 2022

(65) Prior Publication Data
US 2024/0042593 A1    Feb. 8, 2024

(51) Int. Cl.
*B25J 3/00*    (2006.01)
*A61B 34/00*    (2016.01)
(Continued)

(52) U.S. Cl.
CPC ................. *B25J 3/00* (2013.01); *A61B 34/37* (2016.02); *A61B 34/77* (2016.02); *A61B 2034/304* (2016.02)

(58) Field of Classification Search
CPC ........... B25J 3/00; B25J 9/1612; A61B 34/37; A61B 34/77; A61B 2034/304; A61B 90/50; G05B 2219/39552; G05B 2219/45117
See application file for complete search history.

(56) References Cited

U.S. PATENT DOCUMENTS

| 5,053,975 A | 10/1991 | Tsuchihashi et al. |
| 10,052,761 B2 | 8/2018 | Langenfeld et al. |

(Continued)

FOREIGN PATENT DOCUMENTS

| CN | 101224574 A | 7/2008 |
| CN | 102451040 A | 5/2012 |

(Continued)

OTHER PUBLICATIONS

Kucuk, Sedar et al., "Inverse kinematics solution of a new hybrid robot manipulator proposed for medical purposes", IEEE, Oct. 29, 2016 (Oct. 29, 2016), pp. 1-4 URL: https://ieeexplore.ieee.org/abstract/document/7863076 [retrieved on Feb. 7, 2024].

(Continued)

*Primary Examiner* — Dylan M Katz
(74) *Attorney, Agent, or Firm* — Bridgeway IP Law Group, PLLC; Sang Ho Lee; Hyun Woo Shin (57) ABSTRACT

A hybrid master-slave mapping method includes the following steps: acquiring a current position and a target position of an end point of a robotic arm; decomposing a displacement from the current position to the target position into a vertical direction and a horizontal plane to obtain a vertical displacement position and a horizontal displacement position; determining a first control amount of a multi-degree-of-freedom parallel platform according to the vertical displacement position, and determining a second control amount of a passive arm according to the horizontal displacement position; controlling the multi-degree-of-freedom parallel platform according to the first control amount, and (Continued)

controlling the passive arm according to the second control amount.

20 Claims, 6 Drawing Sheets

(51) Int. Cl.
*A61B 34/30* (2016.01)
*A61B 34/37* (2016.01)

(56) References Cited

U.S. PATENT DOCUMENTS

| | | | | |
|---|---|---|---|---|
| 2010/0010504 | A1* | 1/2010 | Simaan | A61B 34/37 606/130 |
| 2019/0192244 | A1 | 6/2019 | Mirbagheri et al. | |
| 2019/0389050 | A1 | 12/2019 | Zhao et al. | |
| 2020/0206961 | A1 | 7/2020 | Tümerdem | |

FOREIGN PATENT DOCUMENTS

| | | |
|---|---|---|
| CN | 103097086 A | 5/2013 |
| CN | 104440864 A | 3/2015 |
| CN | 105615997 A | 6/2016 |
| CN | 106361441 A | 2/2017 |
| CN | 106493708 A | 3/2017 |
| CN | 106890026 A | 6/2017 |
| CN | 107374727 A | 11/2017 |
| CN | 107589934 A | 1/2018 |
| CN | 107662195 A | 2/2018 |
| CN | 107688293 A | 2/2018 |
| CN | 108284425 A | 7/2018 |
| CN | 108446425 A | 8/2018 |
| CN | 208914871 U | 5/2019 |
| CN | 109895101 A | 6/2019 |
| CN | 109968310 A | 7/2019 |
| CN | 110815206 A | 2/2020 |
| CN | 111113425 A | 5/2020 |
| CN | 111214291 A | 6/2020 |
| CN | 111227943 A | 6/2020 |
| CN | 111956329 A | 11/2020 |
| CN | 111956333 A | 11/2020 |
| CN | 112074248 A | 12/2020 |
| JP | 2019155522 A | 9/2019 |
| WO | 2017013828 A1 | 1/2017 |
| WO | 2017/064306 A1 | 4/2017 |

OTHER PUBLICATIONS

European Patent Office, "Extended European Search Report" issued for EP Application No. 20967485.2 on Feb. 19, 2024.

Long Bai et al., "Solving the Time-Varying Inverse Kinematics Problem for the Da Vinci Surgical Robot", Applied Sciences, Feb. 6, 2019, pp. 1-17.

Xie Yonggang et al., "Position Mapping of Six-degree-of-freedom Master-slave Heterogeneous Robot Based on Iterative Algorithm", Machine Design and Research, Feb. 2020, pp. 86-90.

* cited by examiner

HYBRID MASTER-SLAVE MAPPING METHOD, ROBOTIC ARM SYSTEM, AND COMPUTER DEVICE

TECHNICAL FIELD

The present disclosure relates to a control field, and more specifically, to a hybrid master-slave mapping method, a robotic arm system and a computer device.

BACKGROUND ART

At present, surgical robots with multi-degree-of-freedom parallel platforms and passive arms are applied to various surgical procedures. The end of the passive arm of this surgical robot is equipped with a multi-degree-of-freedom parallel platform, and the position and posture control of a surgical instrument are realized by disposing the surgical instrument on a movable platform of the multi-degree-of-freedom parallel platform. However, on one hand, although the movement range of the passive arm is relatively large, all joints of the passive arm are locked during the surgery due to the large volume and weight of the passive arm to prevent a patient from being injured by the passive arm during the surgery; and on the other hand, since the working space of the multi-degree-of-freedom parallel platform is relatively small, the surgical robot cannot move in a large range over a patient's body surface depending on the movement of the parallel platform alone. Therefore, the intraoperative movement range of the surgical robot is small, and no effective solution has been proposed so far.

SUMMARY

According to various embodiments of the present disclosure, a hybrid master-slave mapping method is provided and includes the following steps: acquiring a current position and a target position of an end point of a robotic arm, the robotic arm including a passive arm and a multi-degree-of-freedom parallel platform equipped on an end of the passive arm; decomposing a displacement from the current position to the target position into a vertical direction and a horizontal plane, respectively, to obtain a vertical displacement position and a horizontal displacement position; determining a first control amount of the multi-degree-of-freedom parallel platform according to the vertical displacement position, and determining a second control amount of the passive arm according to the horizontal displacement position; and controlling the multi-degree-of-freedom parallel platform according to the first control amount, and controlling the passive arm according to the second control amount.

According to various embodiments of the present disclosure, a robotic arm system is provided. The robotic arm system includes a computer device and a robotic arm including a passive arm and a multi-degree-of-freedom parallel platform equipped on an end of the passive arm, and the computer device is electrically connected to the passive arm and the multi-degree-of-freedom parallel platform, respectively, includes a processor and a storage medium in which a computer program is stored and is disposed to execute the hybrid master-slave mapping method provided by the embodiments of the present disclosure when run.

According to various embodiments of the present disclosure, a computer device is provided. The computer device includes a processor and a storage medium in which a computer program is stored and is disposed to execute the hybrid master-slave mapping method provided by the embodiments of the present disclosure when run.

BRIEF DESCRIPTION OF THE DRAWINGS

In order to better describe and explain those embodiments and/or examples of the disclosure disclosed herein, one or more figures may be provided for reference. Additional details or examples for describing figures should not be considered as limitations of a range of any one of the disclosed invention, currently described embodiments and/or examples and these best modes of the disclosure understood so far.

DETAILED DESCRIPTION OF EXEMPLARY EMBODIMENTS

Below the hybrid master-slave mapping method, robotic arm system and computer device provided by the present disclosure will be further described.

Figure 1:
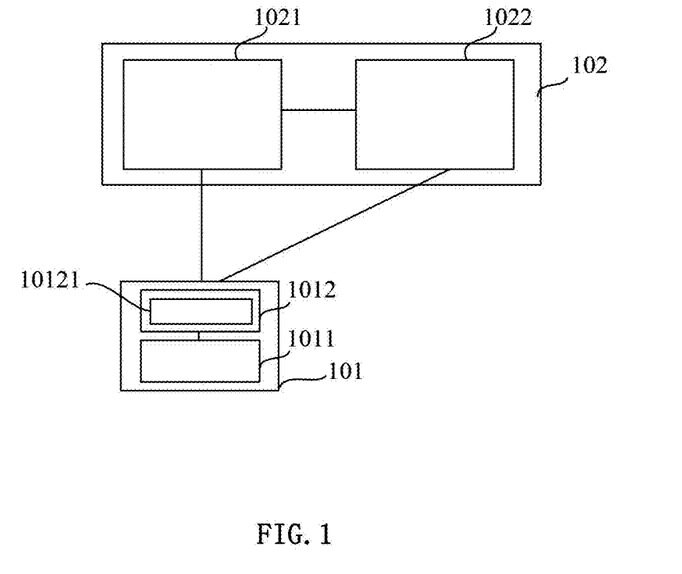
FIG. 1 is a structure block diagram of a robotic arm system provided by embodiments of the present disclosure.

The present embodiment provides a robotic arm system. FIG. 1 is a structure diagram of a robotic arm system provided by embodiments of the present disclosure. As shown in FIG. 1, the robotic arm system includes a computer device 101 and a robotic arm 102 including a passive arm 1021 and a multi-degree-of-freedom parallel platform 1022 equipped on an end of the passive arm 1021.

The passive arm 1021 may include a plurality of joints of which types include but are not limited to a moving joint and a rotating joint so as to ensure the passive arm 1021 to be able to move within a relatively large range. Respective joints of the passive arm 1021 all have locking devices which may lock postures of respective joints to keep a fixed displacement or rotating angles.

The passive arm 1021 may be manually pulled to move near a corresponding surgical position during a preoperative positioning. In the related technologies, respective joints of the passive arm 1021 will be locked before the surgery starts to prevent accidents such as patients being injured caused by falling of the passive arm 1021 during the surgery.

The difference from the related technologies is that not all joints of the passive arm 1021 will be locked in the present embodiment, but only a joint that enables an end point of the robotic arm to generate the displacement in a vertical direction is locked, and the joint that enables an end point of the robotic arm to generate the displacement in a vertical direction include but are not limited to at least one of: a moving joint with the displacement in a vertical direction, or a rotating joint rotating in a non-vertical direction.

Generally speaking, for the convenience of calculation, displacement directions or rotating axes of respective joints of the passive arm 1021 are all parallel to a certain coordinate axis in an orthogonal coordinate system. Taking an orthogonal coordinate system, in which the Z-axis is vertically upwards, the X-axis is horizontally to the right, the Y-axis is perpendicular to the plane in which X-axis and Z-axis lie, and the coordinate axis is disposed to follow the right-hand rule, as an example, in such a case, a moving joint with the displacement in the Z-axis direction and a rotating joint rotating around the X-axis or Y-axis direction are possible to enable the end point of the robotic arm to move vertically downwards, thereby causing potential safety hazard.

Still using the above coordinate axis as an example, if a certain moving joint is parallel to the X-axis or Y-axis, or a rotating axis of a certain rotating joint is parallel to the Z-axis, such a moving joint or rotating joint will not cause the end point of the robotic arm to move vertically downward, therefore, such a moving joint or rotating joint can ensure the safety of the surgical robot even if they are not locked. In addition to the above-mentioned moving joint and rotating joint, the moving joint and rotating joint disposed in other directions in the passive arm 1021 all should be locked during the surgery to ensure surgical safety.

The multi-degree-of-freedom parallel platform of the present embodiment may implement the movement of multiple degrees of freedom. Taking the Stewart parallel platform with six-degree-of-freedom as an example, the Stewart parallel platform includes a static platform, a movable platform and a plurality of telescopic components disposed between the static platform and the movable platform and may implement movements of six degrees of freedom in space, namely, the displacement along the X axis, the displacement along the Y axis, the displacement along the Z axis, rotation around the X axis, rotation around the Y axis and rotation around the Z axis. The Stewart parallel platform is supported by 6 telescopic components, which has higher stiffness and structural stability compared to the passive arm using a series connected cantilever beam structure. Moreover, since the stiffness is higher, the parallel structure has higher load-bearing capacity than the series structure under the same self weight or volume. The errors at the end of the passive arm using a series connected cantilever beam are the accumulation and amplification of various joint errors, resulting in large errors and low accuracy. However, the parallel platform does not have such error accumulation and amplification relationship, but has high micro motion accuracy, which is more appropriate to perform high-precision surgical operations. In addition, the inverse solution of the parallel platform is very easy in terms of position solution, and it is easy to obtain the motion postures of respective telescopic components of the parallel platform according to coordinate positions.

In the above robotic arm system, the computer device 101 is electrically connected to the passive arm 1021 and the multi-degree-of-freedom parallel platform 1022, respectively, and the computer device 101 includes a processor 1011 and a storage medium 1012 in which a computer program 10121 is stored and, when run by the processor, executes a control method of the robotic arm system.

Figure 2:
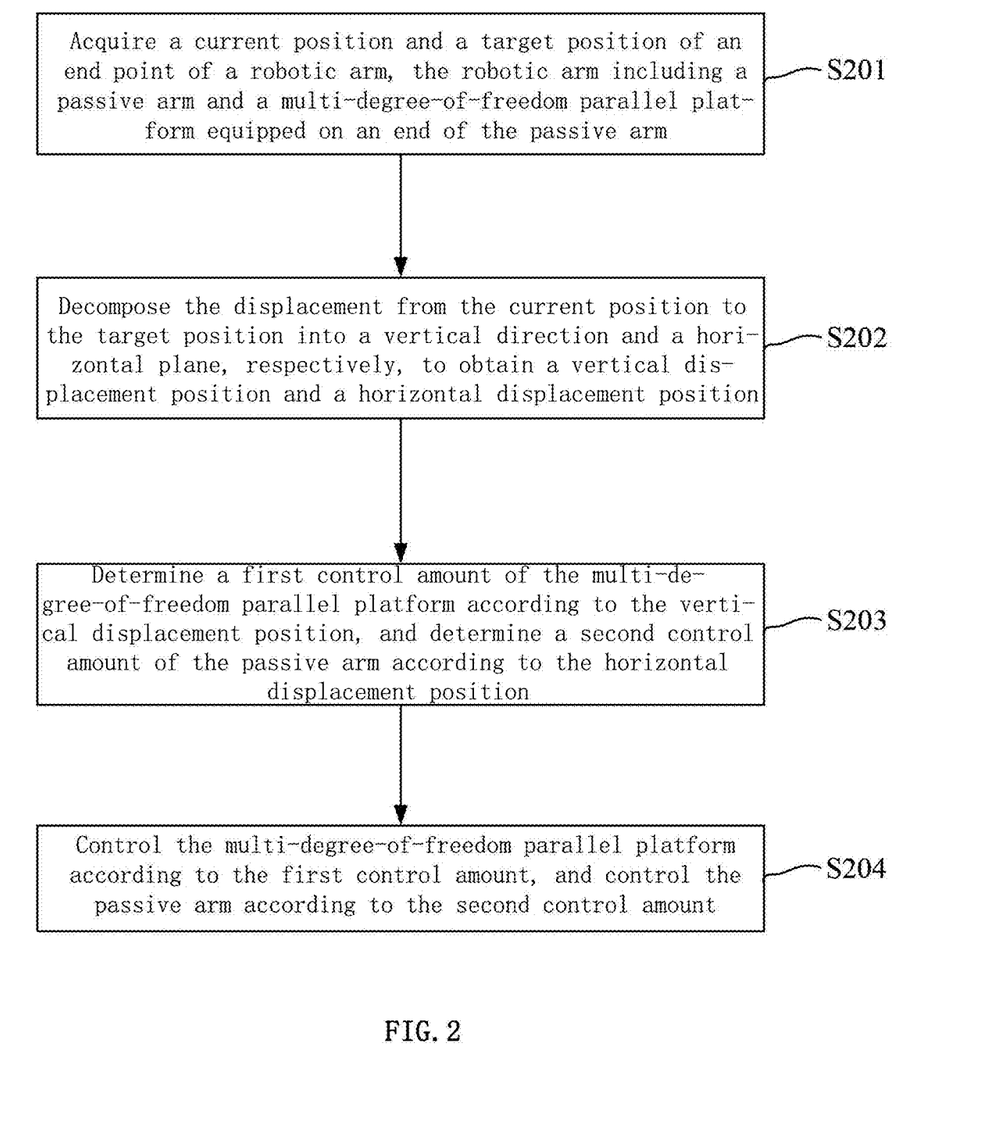
FIG. 2 is a flow diagram of a hybrid master-slave mapping method provided by embodiments of the present disclosure.

FIG. 2 is a flow diagram of a hybrid master-slave mapping method provided by embodiments of the present disclosure. As shown in FIG. 2, the flow includes the following steps.

Step S201: acquiring a current position and a target position of an end point of a robotic arm, the robotic arm including a passive arm and a multi-degree-of-freedom parallel platform equipped on an end of the passive arm.

Step S202: decomposing the displacement from the current position to the target position into a vertical direction and a horizontal plane, respectively, to obtain a vertical displacement position and a horizontal displacement position.

Step S203: determining a first control amount of the multi-degree-of-freedom parallel platform according to the vertical displacement position, and determining a second control amount of the passive arm according to the horizontal displacement position.

Step S204: controlling the multi-degree-of-freedom parallel platform according to the first control amount, and controlling the passive arm according to the second control amount.

Compared to related technologies where all joints of a passive arm must be locked, only a joint that is able to generate the displacement in a vertical direction may be locked in present embodiments, which may be implemented by decomposing the displacement of an end point of the robotic arm into the vertical direction and the horizontal plane. Since the passive arm may move in a larger range within the horizontal plane, and the movement range is much larger than that of the multi-degree-of-freedom parallel platform within the horizontal plane, the movement range of the surgical robot is increased.

In the robotic arm system of the present embodiment, a master-slave mapping method may be adopted to control the passive arm and the multi-degree-of-freedom parallel platform. In some of the embodiments, the robotic arm system further includes a main manipulator; Compared to the related technologies where the main manipulator can only be used to control a multi-degree-of-freedom parallel platform, the difference lies in: in the present embodiment, the main manipulator implements joint control of the passive arm and the multi-degree-of-freedom parallel platform through hybrid mapping.

In some of the embodiments, in order to obtain a current position of the end point of the robotic arm, the end point of the robotic arm may be recorded as the current position at the moment when the main manipulator starts to be operated.

In some of the embodiments, an initial position of the main manipulator is initialized at the moment when the main manipulator starts to be operated, that is, the position where the main manipulator starts to be operated is set to be an initial position. After the main manipulator is operated, the position of the main manipulator is moved to a new position, and this new position is called as a current position of the main manipulator. And a displacement of the main manipulator during the surgery process may be determined according to the initial position of the main manipulator to the current position of the main manipulator, and the displacement will be mapped to the displacement of the robotic arm, so that the end point of the robotic arm is enabled to move from the current position to the target position according to the displacement of the robotic arm determined by the displacement of the main manipulator.

The relationship between the displacement of the main manipulator and the displacement of the end point of the robotic arm is determined according to a preset displacement scale coefficient in the present embodiment. The preset displacement scale coefficient is adjustable. For example, in the case where the preset displacement scale coefficient is less than 1, a displacement value of the main manipulator is greater than a displacement value of the end point of the robotic arm. Thus, in the case where a high-precision surgery is required, the preset displacement scale coefficient may be disposed to be a value less than 1. In the case where the preset displacement scale coefficient is greater than 1, a displacement value of the main manipulator is less than a displacement value of the end point of the robotic arm. Thus, in the case where the end point of the robotic arm is required to move in a larger range, the preset displacement scale coefficient may be disposed to be a value greater than 1 to improve operating experience.

In addition, the first control amount of the multi-degree-of-freedom parallel platform is obtained by inverse solution of a vertical displacement position obtained by decomposing the target position of the end point of the robotic arm in the vertical direction in the above embodiment. Since the inverse solution calculation of the multi-degree-of-freedom parallel platform is very easy, the above manner can reduce the calculation amount and improve control efficiency of the robotic arm.

In some of the embodiments, the determining a second control amount of the passive arm according to the horizontal displacement position includes: determining at least one target moving joint that generates the displacement within a horizontal plane and at least one target rotating joint that rotates around a vertical direction among the plurality of joints; and determining a second control amount of the passive arm according to the horizontal displacement position, in which the second control amount includes a movement amount of the target moving joint and a rotating amount of the target rotating joint.

The inverse solution calculation is more complex than the forward solution calculation in the passive arm using a series structure. In order to reduce the calculation complexity, it is possible to select as few target moving joints and target rotating joints as possible while meeting the requirements of the movement range in some of the embodiments, and ensure that all joints except for the selected target moving joints and target rotating joints are locked. After the other joints are locked, the coordinate conversion relationship between the other joints is fixed, then the unknown coordinate conversion relationship in the inverse solution calculation of the passive arm with a series structure only involves the coordinate conversion relationship between the selected target moving joints and target rotating joints, which greatly reduces calculation complexity.

In some embodiments, the number of the selected target moving joints is 1, and the number of the selected target rotating joint is also 1. The selected one target moving joint may be the moving joint which can move in the maximum range among the moving joints moving in a horizontal plane in the passive arm, thereby ensuring the maximum movement range.

The inverse solution of the passive arm with a series structure may be multiple. In some of the embodiments, in the case where the second control amount of the passive arm is determined according to the horizontal displacement position, after obtaining the control amount of the passive arm according to the inverse solution of the horizontal displacement position, if the control amount of the passive arm obtained from the inverse solution is multiple sets of results, the set of results in which the angle at which the target rotating joint needs to rotate is the smallest is determined as the second control amount; and if the control amount of the passive arm obtained by inverse solution is one set of results, such a set of results is determined to be the second control amount.

Below the present disclosure is described and explained through optional embodiments.

In response to the complex control problem of the passive arm in the related technologies, the present embodiment provides a method for establishing and converting a coordinate system of a passive arm, which is applied to a passive arm including rotating joints and moving joints, and these rotating joints and moving joints are connected in series in order. In order to implement the motion of a passive arm with multiple degrees of freedom in space, the number of rotating joints and moving joints may be set according to the required degree of freedom and movement range, that is, the number of rotating joints and the number of moving joints may be one or more, respectively.

Figure 3:
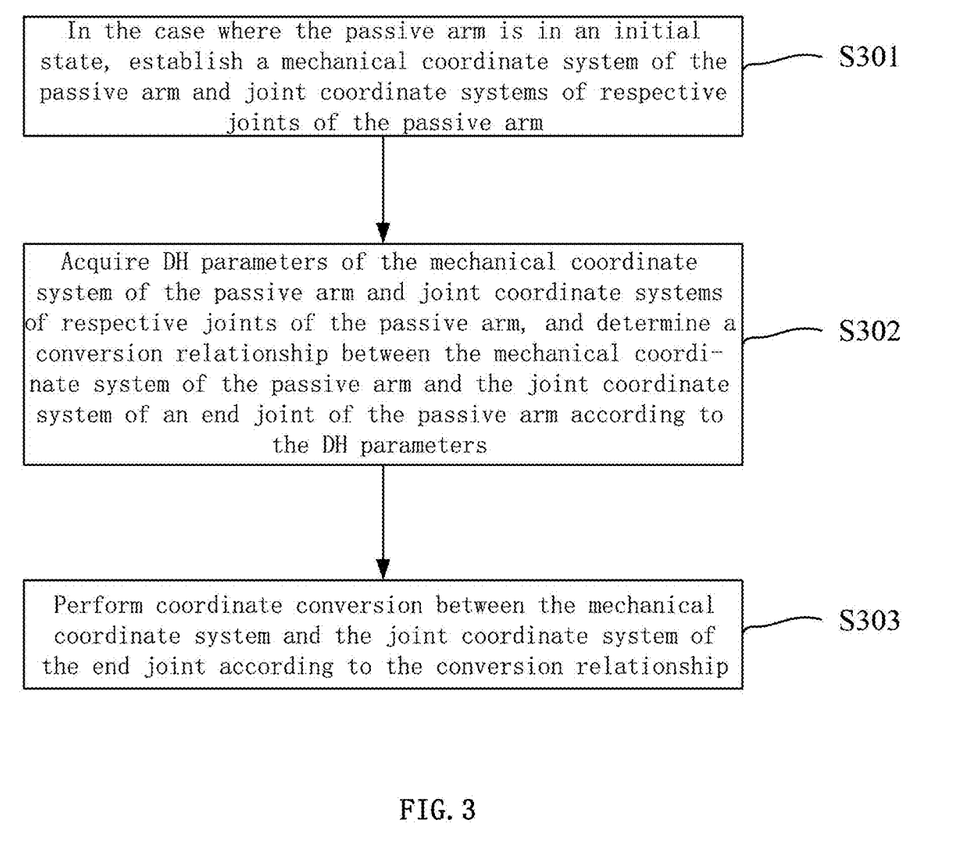
FIG. 3 is a flow diagram of a coordinate conversion method of a passive arm with multiple joints of embodiments of the present disclosure.

FIG. 3 is a flow diagram of a coordinate conversion method of a passive arm with multiple joints of embodiments of the present disclosure. As shown in FIG. 3, the flow includes the following steps S301 to S303.

Step S301: in the case where the passive arm is in an initial state, establishing a mechanical coordinate system of the passive arm and joint coordinate systems of respective joints of the passive arm.

The control of the passive arm is generally converting coordinate systems based on DH parameters. Two connected joints are adjacent joints. The transformation of the joint coordinate systems of two adjacent joints is generally represented by DH parameters or improved DH parameters. Taking the DH parameters as an example, two adjacent joint coordinate systems can coincide with each other by rotating θ around the Z-axis and translating d, and then rotating α around the X-axis and translating a. The above θ, d, α and a are DH parameters. Accordingly, if the DH parameters are more concise, the conversion of two adjacent joint coordinate systems is simpler.

In order to simplify the DH parameters, in the present embodiment, the Z-axis of the joint coordinate system of the rotating joint is disposed along a rotating axis, and the Z-axis of the joint coordinate system of the moving joint is disposed along a moving direction. The mechanical coordinate system and the joint coordinate systems of respective joints are all left-hand or right-hand systems. Moreover, when the joint before the rotating joint is a moving joint, the origin of the joint coordinate system of the rotating joint coincides with the origin of the joint coordinate system of the moving joint.

The above-mentioned mechanical coordinate system may also be called as a global coordinate system, a reference coordinate system or a world coordinate system. The mechanical coordinate system is generally disposed at the center of the base of the passive arm and is located directly below a first joint of the passive arm, such that the conversion relationship between the mechanical coordinate system and the first joint is as simple as possible.

In a multi-joint passive arm, in most cases, in response to the rotating joint receives a command with a rotating angle of 0 or 2π, it may not be necessary to distinguish them, but rather to maintain not rotating or rotate 2π in a set direction according to predetermined settings. However, in some cases, it is necessary to distinguish these two rotating angles. In the case where it is necessary to distinguish rotating angles of 0 and 2π, the rotating angle of the Z-axis in the DH parameters of the rotating joint is not 0 or 2π to avoid confusion between the positions of 0 and 2π.

Step S302: acquiring DH parameters of the mechanical coordinate system of the passive arm and joint coordinate systems of respective joints of the passive arm, and determining a conversion relationship between the mechanical coordinate system of the passive arm and the joint coordinate system of an end joint of the passive arm according to the DH parameters.

After establishing the joint coordinate systems of respective joints, the DH parameters between the adjacent joints may be obtained in order, and a conversion relationship between the mechanical coordinate system of the passive arm and the joint coordinate system of the end joint of the passive arm is determined according to the DH parameters.

According to the DH rule therein, the homogeneous transformation from the coordinate of the (i−1)th joint to the coordinate of the i-th joint is constructed as a sequence with two rotations and two transformations, and the adopted matrix may be represented as follows:

$$_{i}^{i-1}T = \begin{bmatrix} \cos\theta_i & -\sin\theta_i & 0 & a_{i-1} \\ \sin\theta_i \times \cos\alpha_{i-1} & \cos\theta_i \times \cos\alpha_{i-1} & -\sin\alpha_{i-1} & -d_i \times \sin\alpha_{i-1} \\ \sin\alpha_{i-1} \times \sin\theta_i & \sin\alpha_{i-1} \times \cos\theta_i & \cos\alpha_{i-1} & d_i \times \cos\alpha_{i-1} \\ 0 & 0 & 0 & 1 \end{bmatrix}.$$

where i=2, 3, 4, . . . , n; n is a total number of the rotating joints and the moving joints of the passive arm. The DH parameter of the first joint of the passive arm represents a conversion between the coordinate system of the first joint and the mechanical coordinate system, which is recorded as $_{1}^{0}T$, and the conversion relationship between the mechanical coordinate system and the joint coordinate system of the first joint is:

$$_{1}^{0}T = \begin{bmatrix} \cos\theta_1 & -\sin\theta_1 & 0 & 0 \\ \sin\theta_1 \times \cos\alpha_0 & \cos\theta_1 \times \cos\alpha_0 & -\sin\alpha_0 & -d_1 \times \sin\alpha_0 \\ \sin\alpha_0 \times \sin\theta_1 & \sin\alpha_0 \times \cos\theta_1 & \cos\alpha_0 & d_1 \times \cos\alpha_0 \\ 0 & 0 & 0 & 1 \end{bmatrix}.$$

Accordingly, the transformation relationship is totally the same as the homogeneous transformation manner from the coordinate of the (i−1)th joint to the coordinate of the i-th joint.

After obtaining $_{1}^{0}T$ and $_{i}^{i-1}T$, the conversion matrix from the 0th coordinate system (the mechanical coordinate system) to the joint coordinate system of the N-th joint may be represented as:

$$_{N}^{0}T = {_{1}^{0}T} \cdot {_{2}^{1}T} \cdot \ldots \cdot {_{N-1}^{N-2}T} \cdot {_{N}^{N-1}T}.$$

where the N-th joint is an end joint.

Step S303: performing coordinate conversion between the mechanical coordinate system and the joint coordinate system of the end joint according to the conversion relationship.

The $_{N}^{0}T$ determined in the above step S302 represents the coordinate conversion relationship between the mechanical coordinate system and the joint coordinate system of the end joint, and coordinate conversion between the mechanical coordinate system and the joint coordinate system of the end joint may be implemented according to the conversion relationship.

Figure 4:
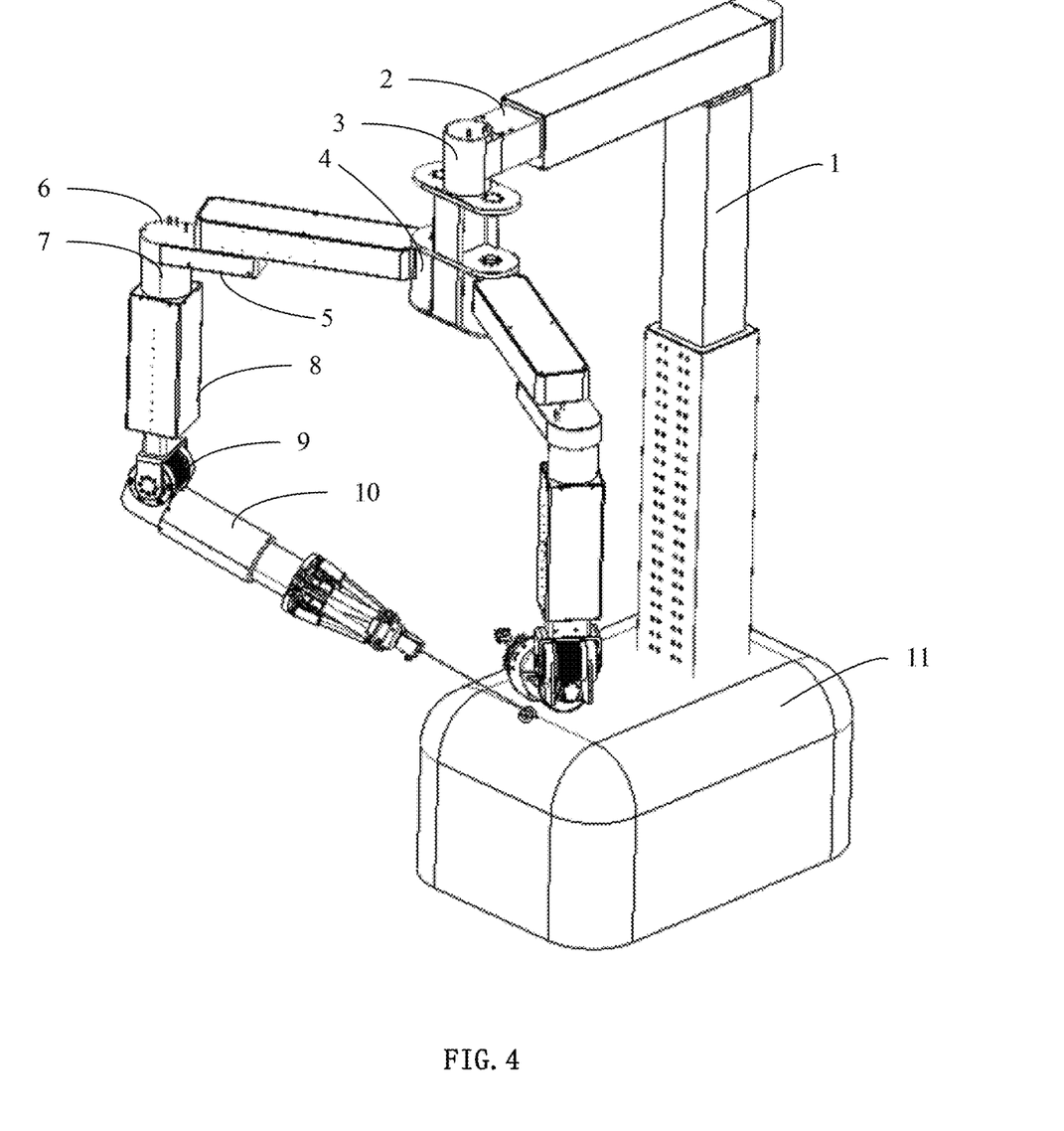
FIG. 4 is a structure diagram of a robotic arm provided by optional embodiments of the present disclosure.

FIG. 4 is a structure diagram of a robotic arm provided by optional embodiments of the present disclosure. The robotic arm shown in FIG. 4 includes a passive arm and a multi-degree-of-freedom parallel platform in order, and the passive arm includes: moving joint 1, rotating joint 2, moving joint 3, rotating joint 4, rotating joint 5, moving joint 6, rotating joint 7, moving joint 8, rotating joint 9 and moving joint 10. The multi-degree-of-freedom parallel platform is fixed to an end of a joint arm of the moving joint 10. The robotic arm further includes a base 11 fixed to the moving joint 1.

The coordinate conversion method of the robotic arm of the optional embodiment includes step 1 to step 3, which correspond to step S301 to step S303 in FIG. 3, respectively.

Step 1: establishing a mechanical coordinate system and joint coordinate systems of respective joints at a base of the passive arm according to a rule of a world coordinate system.

Figure 5:
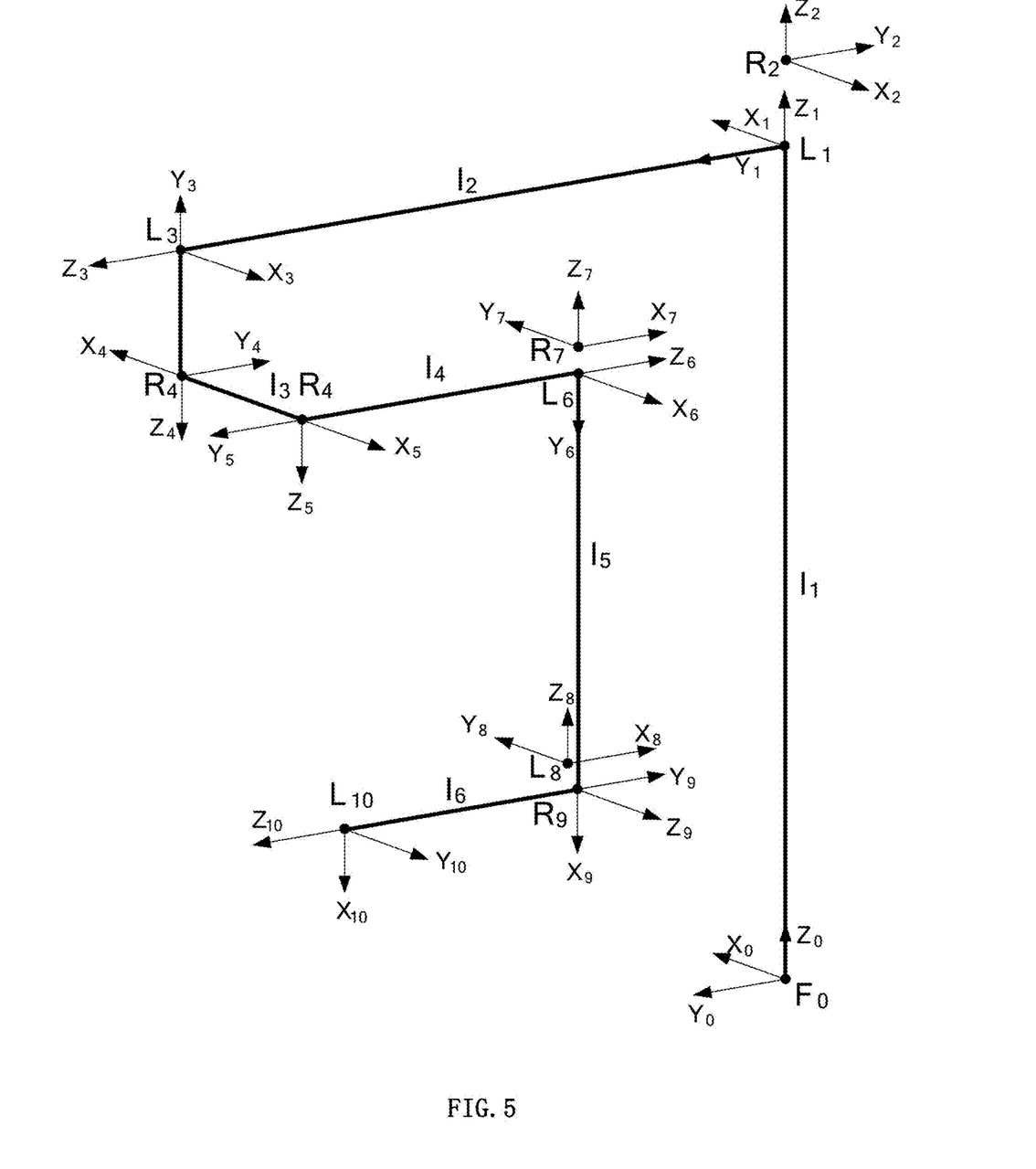
FIG. 5 is a diagram of a mechanical coordinate system and a joint coordinate system of a robotic arm provided by optional embodiments of the present disclosure.

FIG. 5 is a diagram of a mechanical coordinate system and a joint coordinate system of a robotic arm provided by optional embodiments of the present disclosure.

Referring to FIG. 5, a coordinate system origin $F_0$ of the mechanical coordinate system $F_0$-$X_0Y_0Z_0$ is fixed to the base of the passive arm, the $Z_0$-axis points towards the moving joint 1 from $F_0$, the $Y_0$-axis points towards the passive arm from the base $F_0$ point, and the pointed direction of the $X_0$-axis meets the right-hand coordinate system.

The origin $L_1$ of the joint coordinate system $L_0$-$X_1Y_1Z_1$ of the moving joint 1 is fixed to the moving joint 1, and the pointed directions of respective coordinate axes are the same as that of the corresponding axis of the mechanical coordinate system.

The origin $R_2$ of the joint coordinate system $R_2$-$X_2Y_2Z_2$ of the rotating joint 2 is fixed to the rotating joint 2 and coincides with $L_1$, the pointed direction of the $Z_2$-axis is the same as that of the $Z_1$-axis, and the pointed directions of the $X_2$-axis and the $Y_2$-axis are contrary to those of the $X_1$-axis and the $Y_1$-axis, respectively.

The origin $L_3$ of the joint coordinate system $L_3$-$X_3Y_3Z_3$ of the moving joint 3 is fixed to the moving joint 3, the $Z_3$ axis points towards $L_3$ point from $L_1$ point, and the pointed directions of the $X_3$-axis and the $Y_3$-axis are the same as those of the $X_2$-axis and the $Z_2$-axis, respectively.

The origin $R_4$ of the joint coordinate system $R_4$-$X_4Y_4Z_4$ of the rotating joint 4 is fixed to the rotating joint 4 and coincides with $L_3$ point ($L_3$ and $R_4$ are separately marked in order to clearly mark the joint coordinate system of the moving joint 3 an the joint coordinate system of the rotating joint 4 in FIG. 5, the same below), the pointed direction of the $Z_4$-axis is contrary to that of the $Y_3$-axis, and initially, the pointed directions of the $X_4$-axis and $Y_4$-axis are contrary to those of the $X_3$-axis and $Z_3$-axis, respectively.

The origin $R_5$ of the joint coordinate system $R_5$-$X_5Y_5Z_5$ of the rotating joint 5 is fixed to the rotating joint 5, the pointed direction of the $Z_5$-axis is the same as that of the $Z_4$-axis, and initially, the pointed directions of the $X_5$-axis and $Y_5$-axis are contrary to those of the $X_4$-axis and $Y_4$-axis, respectively.

The origin $L_6$ of the joint coordinate system $L_6$-$X_6Y_6Z_6$ of the moving joint 6 is fixed to the moving joint 6, the $Z_6$-axis points towards $L_6$ point from $R_5$ point, and the pointed directions of the $X_6$-axis and the $Y_6$-axis are the same as those of the $X_5$-axis and the $Z_5$-axis, respectively.

The origin $R_7$ of the joint coordinate system $R_7$-$X_7Y_7Z_7$ of the rotating joint 7 is fixed to the rotating joint 7 and coincides with $L_6$ point, initially, the pointed directions of the $Z_7$-axis and the $Y_7$-axis are contrary to those of the $Y_6$-axis and the $X_6$-axis, respectively, and the pointed direction of the $X_7$-axis is the same as that of the $Z_6$-axis.

The origin $L_8$ of the joint coordinate system $L_8$-$X_8Y_8Z_8$ of the moving joint 8 is fixed to the moving joint 8, the $Z_8$-axis points towards $R_7$ point from $L_8$ point, and the pointed directions of the $X_8$-axis and the $Y_8$-axis are the same as those of the $X_7$-axis and the $Y_7$-axis, respectively.

The origin $R_9$ of the joint coordinate system $R_9$-$X_9Y_9Z_9$ of the rotating joint 9 is fixed to the rotating joint 9 and coincides with $L_8$ point, the direction of the $Z_9$-axis is contrary to that of the $Y_8$-axis, initially, the direction of the $X_9$-axis is contrary to that of the $Z_8$-axis, and the direction of the $Y_9$-axis is the same as that of the $X_8$-axis.

The origin $L_{10}$ of the joint coordinate system $L_{10}$-$X_{10}Y_{10}Z_{10}$ of the moving joint 10 is fixed to the moving joint 10, the $Z_{10}$-axis points towards $L_{10}$ point from $R_9$ point, and the pointed directions of the $X_{10}$-axis and the $Y_{10}$-axis are the same as those of the $X_9$-axis and the $Z_9$-axis, respectively.

The length of $F_0R_2$ is $l_1$, the length of $R_2R_4$ is $l_2$, the length of $R_4R_5$ is $l_3$, the length of $R_5R_7$ is $l_4$, the length of $R_7R_9$ is $l_5$, the length of $R_9L_{10}$ is $l_6$, an points $L_1$, $R_2$, $L_3$, $R_4$, $R_5$, $L_6$ and $R_7$ are located on the same horizontal plane.

Step 2: acquiring DH parameters, and calculating a conversion relationship between the mechanical coordinate system and the end point of the multi-joint passive arm, and the DH parameters may be traditional DH parameters or improved DH parameters.

DH parameters are illustrated in Table 1.

TABLE 1

DH Parameter Table of Multi-joint Passive Arm Shown in FIG. 5

| Item | 0 | 1 | 2 | 3 | 4 | 5 | 6 | 7 | 8 | 9 | 10 |
|---|---|---|---|---|---|---|---|---|---|---|---|
| Z-axis translates $d_i$ | — | $d_1$ | 0 | $d_3$ | 0 | 0 | $d_6$ | 0 | $d_8$ | 0 | $d_{10}$ |
| Z-axis rotates $\theta_i$ | — | 0 | $\pi + \theta_2$ | 0 | $\pi + \theta_4$ | $\pi + \theta_5$ | 0 | $\frac{\pi}{2} + \theta_7$ | 0 | $-\frac{\pi}{2} + \theta_9$ | 0 |
| X-axis rotates $\alpha_i$ | — | 0 | 0 | $\frac{\pi}{2}$ | $\frac{\pi}{2}$ | 0 | $\frac{\pi}{2}$ | $\frac{\pi}{2}$ | 0 | $\frac{\pi}{2}$ | $\frac{\pi}{2}$ |
| X-axis translates $a_i$ | — | 0 | 0 | 0 | 0 | $a_4$ | 0 | 0 | 0 | 0 | 0 |

A parallel platform may be further equipped on the end joint of the multi-joint robotic arm as shown in FIG. 4, the parallel platform includes a static platform, a movable platform and a plurality of telescopic components disposed between the static platform and the movable platform, the calculation coordinate system of the parallel platform totally coincides with the joint coordinate system of the end joint of the multi-joint robotic arm, and an ultrasonic detection device is disposed on the movable platform.

The parallel platform of the present embodiment may implement the movement of multiple degrees of freedom. Taking the Stewart parallel platform with six-degree-of-freedom as an example, the Stewart parallel platform includes a static platform, a movable platform and a plurality of telescopic components disposed between the static platform and the movable platform and may implement movements of six degrees of freedom in space, namely, the displacement along the X axis, the displacement along the Y axis, the displacement along the Z axis, rotation around the X axis, rotation around the Y axis and rotation around the Z axis. The Stewart parallel platform is supported by 6 telescopic components, which has higher stiffness and structural stability compared to the passive arm using a series connected cantilever beam structure. Moreover, since the stiffness is higher, the parallel structure has higher load-bearing capacity than the series structure under the same self weight or volume. The errors at the end of the passive arm using a series connected cantilever beam are the accumulation and amplification of various joint errors, resulting in large errors and low accuracy. However, the parallel platform does not have such error accumulation and amplification relationship, but has high micro motion accuracy, which is more appropriate to perform high-precision surgical operations. In addition, the inverse solution of the parallel platform is very easy in terms of position solution, and it is easy to obtain the motion postures of respective telescopic components of the parallel platform according to coordinate positions.

It is precisely based on the characteristic of easy inverse solution of parallel platforms, in the above embodiments, the position information of the target position in the calculation coordinate system may be obtained by establishing a slave user coordinate system on the static platform, mapping the displacement amount of the main operator to the slave user coordinate system, and then converting between the slave user coordinate system and the calculation coordinate system. According to the position information, the motion posture of respective telescopic components of the parallel platform can be easily obtained by inverse solution. Compared to the position information of the end of the parallel platform solved by forward kinematics in related technologies, the above method greatly reduces the calculation complexity, improves the control efficiency and saves calculation resources.

To solve the conversion matrix from the Stewart calculation coordinate system to the mechanical coordinate system is to move the conversion matrix and the inverse matrix from the joint coordinate system $L_{10}$-$X_{10}Y_{10}Z_{10}$ to the mechanical coordinate system $F_0$-$X_0Y_0Z_0$.

According to the forward kinematics of robot, the conversion matrix between two adjacent joints may be known as:

$$T_i = \begin{bmatrix} \cos\theta_i & -\sin\theta_i & 0 & a_{i-1} \\ \sin\theta_i \times \cos\alpha_{i-1} & \cos\theta_i \times \cos\alpha_{i-1} & -\sin\alpha_{i-1} & -d_i \times \sin\alpha_{i-1} \\ \sin\alpha_{i-1} \times \sin\theta_i & \sin\alpha_{i-1} \times \cos\theta_i & \cos\alpha_{i-1} & d_i \times \cos\alpha_{i-1} \\ 0 & 0 & 0 & 1 \end{bmatrix}.$$

The conversion matrix from the m-th joint (including a degree of freedom of the m-th joint) to the n-th joint may be represented as:

$$_n^m T = _{m+1}^m T \cdot _{m+2}^{m+1} T \cdots _{n-1}^{n-2} T \cdot _n^{n-1} T.$$

A conversion matrix $_{10}^0 T$ of a single passive arm from the base to the static platform of the Stewart platform may be solved, that is, a conversion matrix from the mechanical coordinate system to the Stewart calculation coordinate system is named as $T_{trans\_mach\_st}$, and a conversion matrix from the Stewart calculation coordinate system to the mechanical coordinate system is the inverse matrix $T_{trans\_mach\_st}^{-1}$.

Step 3: performing coordinate conversion between the mechanical coordinate system and the Stewart calculation coordinate system according to the conversion matrix and the inverse matrix of the conversion matrix.

In the robotic arm system using master-slave control, a user coordinate system may be further established on the robotic arm in order to simplify the motion mapping of the master-slave control.

In the case where the robotic arm is a single arm, the coordinate conversion method of the robotic arm as shown in FIG. 3 may further include the following steps.

Step 1: establishing a user coordinate system, in which an XY coordinate plane of the user coordinate system is parallel to an XY plane of the mechanical coordinate system, and the origin of the user coordinate system coincides with the origin of the joint coordinate system of the end joint.

Step 2: acquiring a visual angle value input by the user and determining a conversion relationship between the user coordinate system and the mechanical coordinate system according to the visual angle value and the conversion relationship between the mechanical coordinate system and the joint coordinate system of the end joint.

The angle that the XY coordinate plane of the user coordinate system established in step 2 rotates around the Z-axis is the visual angle value. The visual angle value is voluntarily input by the user according to a visual angle during the work with a single arm, and is named as $\theta_{theta\_mach\_user}$. According to the definition manner of the user coordinate, a conversion matrix of the user coordinate system with respect to the mechanical coordinate system may be obtained:

$$T_{trans\_mach\_user} = \begin{bmatrix} \cos(\theta_{theta\_mach\_user}) & -\sin(\theta_{theta\_mach\_user}) & 0 & {}_{10}^{0}T(1,4) \\ \sin(\theta_{theta\_mach\_user}) & \cos(\theta_{theta\_mach\_user}) & 0 & {}_{10}^{0}T(2,4) \\ 0 & 0 & 0 & {}_{10}^{0}T(3,4) \\ 0 & 0 & 0 & 1 \end{bmatrix}.$$

where ${}_{10}^{0}T(1,4)$ represents data in line 1 and column 4 of the above ${}_{10}^{0}T$.

Below the hybrid master-slave mapping method of the present optional embodiment is explained by taking equipping an ultrasonic detection device on a movable platform of the multi-degree-of-freedom parallel platform as an example. Since the ultrasonic detection device needs to move in a wide range over a patient's body surface to obtain comprehensive images, hybrid mapping of the robotic arm may be implemented using the control method of the robotic arm system of the present optional embodiment, and moving in a wide range can be realized.

In the present optional embodiment, an end point of the ultrasonic detection device is located on the axis of the movable platform of the multi-degree-of-freedom parallel platform.

Manipulating an ultrasonic probe requires a wide movement range over a patient's body surface during clinical application, that is, in the XY plane of the mechanical coordinate system, while the direction perpendicular to the patient's body surface does not require a wide movement range, that is, in the Z-axis direction of the mechanical coordinate system. Since the volume of the passive arm is relatively large and the weight of the passive arm is heavy, the moving joints along the Z-axis direction and the rotating joints around the X-axis and Y-axis directions must be locked during the surgery to ensure surgery safety. Thus, the movement of the main manipulator along the Z-axis direction of the mechanical coordinate system (the Z-axis of the mechanical coordinate system is parallel to the Z-axis of the user coordinate system according to a user coordinate system establishment guideline) is mapped to the Stewart parallel platform to be finished, and the movement of the main manipulator in the XY plane of the mechanical coordinate system (the XY plane of the mechanical coordinate system is parallel to the XY plane of the user coordinate system according to a user coordinate system establishment guideline) is mapped to one rotating joint and one moving joint of the passive arm.

The hybrid mapping method of the present optional embodiment includes the following steps.

Step 1: selecting one moving joint $d_6$ and one rotating joint $\theta_5$ around the Z-axis of the passive arm in the XY plane of the mechanical coordinate system as two control objects in the series part of the hybrid control. The Stewart parallel platform is used as a control object of the parallel part.

Step 2: the surgical operation period from the moment when the operator holds the main manipulator to start the surgical operation to the moment when the hand leaves the main manipulator and stops is considered as a work cycle T.

Step 3: the moment when the operator holds the main manipulator to start the surgical operation is time $T(0)$, and the position coordinate of the main manipulator at the moment is set to be an origin $M_0$ (0, 0, 0); and the position coordinate of the instrument end point at the moment in the user coordinate system is $S_0$ ($X_0$, $Y_0$, $Z_0$), and the system will calculate and save $S_0$ ($X_0$, $Y_0$, $Z_0$) as a known value recorded as $C_{coord\_now\_user}$.

Step 4: the position coordinate of the main manipulator is set to be $M_t$ ($X_{mt}$, $Y_{mt}$, $Z_{mt}$) at any time t within the work cycle, recorded as $C_{coord\_offset\_mas}$:

$C_{coord\_offset\_mas} = [cx_{coord\_offset\_mas} cy_{coord\_offset\_mas} cz_{coord\_offset\_mas}]$.

The position coordinate $S_t$ ($X_t$, $Y_t$, $Z_t$) of the motion target point of the instrument end point in the user coordinate system may be obtained through $M_t$ ($X_{mt}$, $Y_{mt}$, $Z_{mt}$) by the displacement scaling-up coefficient $K_1$:

$X_t = X_0 + K_1 * X_{mt}$;

$Y_t = Y_0 + K_1 * Y_{mt}$;

$Z_t = Z_0 + K_1 * Z_{mt}$.

The position coordinate of the instrument end point in the user coordinate system based on time $T(0)$ is $S_0$ ($X_0$, $Y_0$, $Z_0$), and the main manipulator will transmit the current coordinate $M_t$ ($X_{mt}$, $Y_{mt}$, $Z_{mt}$) to solve the coordinate $S_t$ ($X_t$, $Y_t$, $Z_t$) of the instrument end point at the moment in the user coordinate system during each motion execution cycle, recorded as $C_{coord\_new\_user}$:

$C_{coord\_new\_user} = C_{coord\_now\_user} + K_0 \times C_{coord\_offset\_mas}$.

Step 5: decomposing the motion of the main manipulator in the user coordinate system into the displacement in the Z-axis direction and the displacement in the XY plane, and the motion decomposition point $S'$ ($X_0$, $Y_0$, $Z_t$) from the initial point $S_0$ ($X_0$, $Y_0$, $Z_0$) to the target point $S_t$ ($X_t$, $Y_t$, $Z_t$) is recorded as $C_{coord\_znew\_user}$:

$C_{coord\_znew\_user} = [C_{coord\_now\_user}(1) C_{coord\_now\_user}(2)$
$\quad C_{coord\_new\_user}(3) 1]^T$.

Step 6: converting the coordinate of the motion decomposition point S' ($X_0$, $Y_0$, $Z_0$) in the user coordinate system to the Stewart calculation coordinate system through a conversion matrix from the user coordinate system to the Steward calculation coordinate system, recorded as $C_{coord\_znew\_st}$:

$C_{coord\_znew\_st} = T_{trans\_st\_user} \cdot C_{coord\_znew\_user}$.

where $T_{trans\_st\_user}$ is the conversion matrix from the user coordinate system to the Steward calculation coordinate system.

Step 7: given the coordinate of the instrument end point in the Stewart calculation coordinate system, solving the motion amounts of respective joints in the platform through the inverse kinematics of the Stewart platform and finishing the motion mapping from the motion of the main manipulator in the Z-axis direction of the mechanical coordinate to the Stewart parallel platform.

Step 8: next, solving the motion mapping from the motion of the main manipulator in the XY plane of the mechanical coordinate to the passive arm; since the motion of the passive arm does not affect the coordinate of the end point of the ultrasonic probe in the Stewart calculation coordinate system, after one motion execution cycle, the coordinate of the end point of the ultrasonic probe in the Stewart calculation coordinate system is still $C_{coord\_znew\_st}$, while the coordinate in the user coordinate system is changed to $C_{coord\_new\_user}$, the coordinate transformation formula may be obtained:

$C_{coord\_new\_user} = T_{trans\_user\_mach} \cdot {}_4^0 T \cdot {}_6^5 T \cdot {}_{10}^7 T \cdot C_{coord\_znew\_st}$.

where $T_{trans\_user\_mach}$ is the conversion matrix from the mechanical coordinate system to the user coordinate system.

where ${}_j^i T$ represents a conversion matrix from the j-th joint to the i-th joint on the passive arm.

The above formula is transformed to:

${}_4^0 T^{-1} T_{trans\_user\_mach}^{-1} C_{coord\_new\_user} = {}_6^5 T \cdot ({}_{10}^7 T \cdot C_{coord\_znew\_st})$.

Since other motion joints of the passive arm are all locked except that two motion amounts of $\theta_5$ and $d_6$ are involved in the hybrid control, the motion amounts of the other joints are all determined, and conversion matrices between joints are also known, thus, the left side of the equation is a known quantity, which is replaced with $[x_2, y_2, z_2, 1]^T$: the coordinate $C_{coord\_znew\_st}$ of the end point of the ultrasonic probe in the Stewart calculation coordinate system has been solved in the last step, and is not changed due to the motion of the passive arm, thus, the right side of the equation ${}_{10}^7 T \cdot C_{coord\_znew\_st}$ is also a known quantity, which is replaced with $[x_1, y_1, z_1, 1]^T$.

Furthermore, the above equation may be simplified into the following form by incorporating the DH parameters of the joints 5 and 6 into the conversion matrix ${}_6^5 T$:

$$\begin{bmatrix} x_2 \\ y_2 \\ z_2 \\ 1 \end{bmatrix} = \begin{bmatrix} \cos(\theta_5 + \pi) & 0 & \sin(\theta_5 + \pi) & d_6 \cdot \sin(\theta_5 + \pi) + a_4 \\ \sin(\theta_5 + \pi) & 0 & -\cos(\theta_5 + \pi) & -d_6 \cdot \cos(\theta_5 + \pi) \\ 0 & 1 & 0 & 0 \\ 0 & 0 & 0 & 1 \end{bmatrix} \cdot \begin{bmatrix} x_2 \\ y_2 \\ z_2 \\ 1 \end{bmatrix}.$$

The equation is solved to obtain:

$\theta_5 = \operatorname{atan} 2(a_4 - x_2, y_2) - \operatorname{atan} 2(x_1, \pm\sqrt{(a_4 - x_2)^2 + y_2^2 - x_1^2})$.

Regarding the situation where inverse solutions are multiple in the last step, the principle of proximity is adopted, the closest value is selected as the final solution, by subtracting the initial value of $\theta_5$ with two solutions, respectively, and taking absolute values, and taking the solution with the smaller absolute value, so that the rotating joint of the passive arm can rotate by the minimum angle to reach the target point.

In the case where $\theta_5$ is known, the moving joint $d_6$ may be obtained:

$$d_6 = \frac{x_1 \cdot \sin\theta_5 + y_2}{\cos\theta_5} - z_1.$$

So far, the motion mapping from the motion of the main manipulator in the XY plane of the mechanical coordinate to the passive arm is finished.

Figure 6:
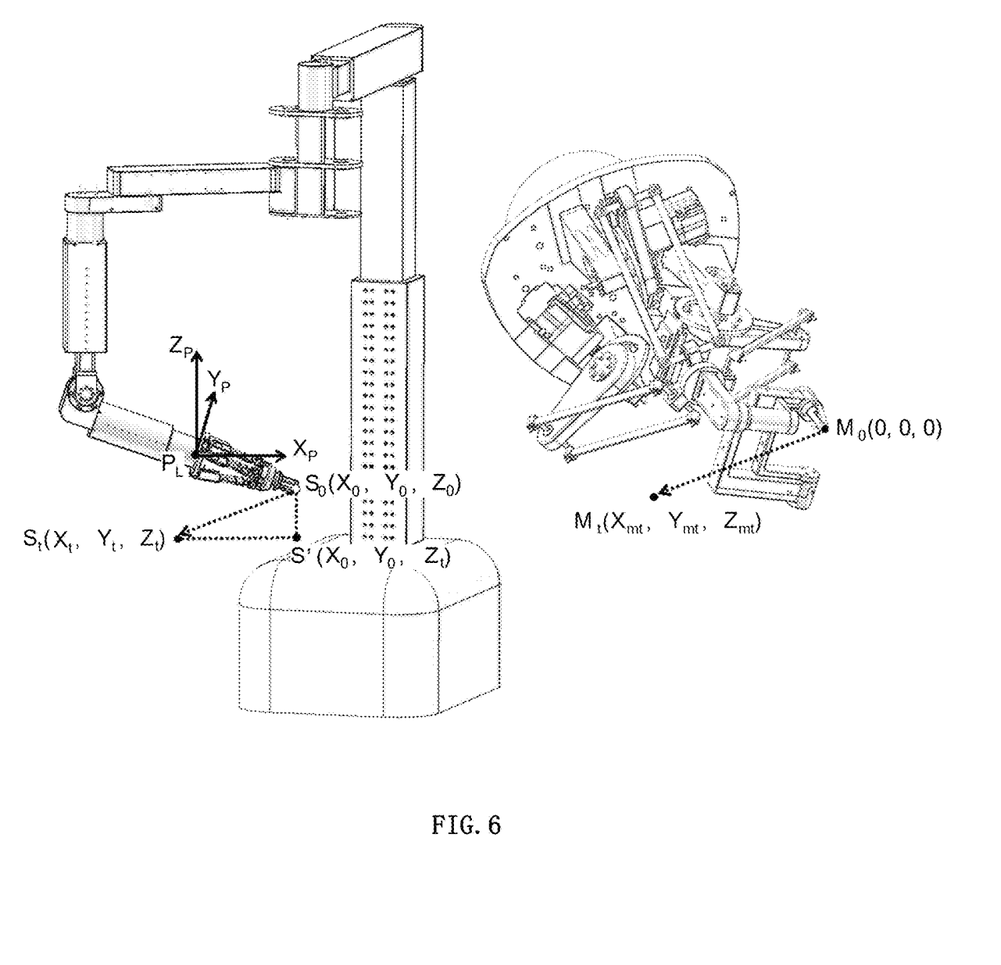
FIG. 6 is a motion mapping diagram of a main manipulator and an end point of an ultrasonic probe in a user coordinate system provided by optional embodiments of the present disclosure.

The motion mapping diagram of the main manipulator and the end point of the ultrasonic probe in the user coordinate system is illustrated in FIG. 6, in which the motion of the probe from $S_0$ to S' is implemented through the motion of the Stewart platform, and the motion from S' to $S_t$ is implemented by the motions of the rotating joint and the moving joint of the passive arm. It is worth noting that S' is the hypothetical reference point that decomposes the motion of the probe in the Z-axis direction and the motion in the XY plane, but is not the trajectory point of the probe in actual work.

A computer device is further provided in the present embodiment and includes a storage medium in which a computer program is stored and a processor which is disposed to execute the computer program to execute steps in the above any one method embodiment.

Alternatively, the above computer device may further include a transmission device and an input and output device, wherein the transmission device is connected to the above processor, and the input and output device is connected to the above processor.

Alternatively, the above processor may be disposed to execute the following steps through the computer program in the present embodiment.

S1: acquiring a current position and a target position of an end point of a robotic arm, the robotic arm including a passive arm and a multi-degree-of-freedom parallel platform equipped on an end of the passive arm.

S2: decomposing the displacement from the current position to the target position into a vertical direction and a horizontal plane, respectively, to obtain vertical and horizontal displacement positions.

S3: determining a first control amount of the multi-degree-of-freedom parallel platform according to the vertical displacement position, and determining a second control amount of the passive arm according to the horizontal displacement position.

S4: controlling the multi-degree-of-freedom parallel platform according to the first control amount, and controlling the passive arm according to the second control amount.

It should be noted that for the specific example in the present embodiment, the examples described in the above embodiments and optional embodiments may be provided for reference, and will not be described again in the present embodiment.

According to various embodiments of the present disclosure, a hybrid master-slave mapping method is provided and includes the following steps: acquiring a current position and a target position of an end point of a robotic arm, the robotic arm including a passive arm and a multi-degree-of-freedom parallel platform equipped on an end of the passive arm; decomposing a displacement from the current position to the target position into a vertical direction and a horizontal plane, respectively, to obtain a vertical displacement position and a horizontal displacement position; determining a first control amount of the multi-degree-of-freedom parallel platform according to the vertical displacement position, and determining a second control amount of the passive arm according to the horizontal displacement position; and controlling the multi-degree-of-freedom parallel platform according to the first control amount, and controlling the passive arm according to the second control amount.

The above hybrid master-slave mapping method has following advantages: compared to related technologies where all joints of a passive arm must be locked, only a joint that is able to generate the displacement in a vertical direction may be locked in present embodiments, which may be implemented by decomposing the displacement of an end point of the robotic arm into the vertical direction and the horizontal plane. Since the passive arm may move in a larger range within the horizontal plane, and the movement range is much larger than that of the multi-degree-of-freedom parallel platform within the horizontal plane, the movement range of the surgical robot is increased, the problem of the small intraoperative movement range of the surgical robot in the related technologies is solved, and the movement range of the surgical robot is improved.

In some of the embodiments, the robotic arm is controlled by a main manipulator; and the acquiring a current position of an end point of the robotic arm includes: recording a position of the end point of the robotic arm as the current position at the moment when the main manipulator starts to be operated.

In some of the embodiments, the robotic arm is controlled by a main manipulator; and the acquiring a target position of an end point of the robotic arm includes: initializing an initial position of the main manipulator at the moment when the main manipulator starts to be operated; after the main manipulator is operated, determining a current position of the main manipulator and determining a displacement of the main manipulator according to the current position and the initial position of the main manipulator; and converting the displacement of the main manipulator into a target displacement of the robotic arm according to a preset displacement scale coefficient and determining the target position according to the target displacement and the current position of the end point of the robotic arm.

In some of the embodiments, the preset displacement scale coefficient is adjustable.

In some of the embodiments, the passive arm includes a plurality of joints; the determining a second control amount of the passive arm according to the horizontal displacement position includes: determining at least one target moving joint that generates the displacement within a horizontal plane and at least one target rotating joint that rotates around a vertical direction among the plurality of joints; and determining a second control amount of the passive arm according to the horizontal displacement position, in which the second control amount includes a movement amount of the target moving joint and a rotating amount of the target rotating joint.

In some of the embodiments, the determining a second control amount of the passive arm according to the horizontal displacement position includes: obtaining a control amount of the passive arm by inverse solution according to the horizontal displacement position; in the case where a control amount of the passive arm obtained by inverse solution is multiple sets of results, determining a set of results of the minimum angle at which the target rotating joint needs to rotate to be the second control amount; and in the case where a control amount of the passive arm obtained by inverse solution is one set of results, determining such a set of results to be the second control amount.

According to various embodiments of the present disclosure, a robotic arm system is provided. The robotic arm system includes a computer device and a robotic arm including a passive arm and a multi-degree-of-freedom parallel platform equipped on an end of the passive arm, and the computer device is electrically connected to the passive arm and the multi-degree-of-freedom parallel platform, respectively, includes a processor and a storage medium in which a computer program is stored and is disposed to execute the hybrid master-slave mapping method provided by the embodiments of the present disclosure when run.

In some of the embodiments, the passive arm includes a plurality of joints among which a joint that enables an end point of the robotic arm to generate the displacement in a vertical direction is locked.

In some of the embodiments, a joint that enables an end point of the robotic arm to generate the displacement in a vertical direction among the plurality of joints includes at least one of: a moving joint with the displacement in a vertical direction, or a rotating joint rotating in a non-vertical direction.

According to various embodiments of the present disclosure, a computer device is provided. The computer device includes a processor and a storage medium in which a computer program is stored and is disposed to execute the hybrid master-slave mapping method provided by the embodiments of the present disclosure when run.

In addition, combined with the method in the above embodiment, the embodiment of the present disclosure further provides a storage medium for implementation. Computer program instructions are stored on the medium; The computer program instructions, when run by the processor, implement any one hybrid master-slave mapping method in the above embodiment.

It should be noted that for the specific example in the present embodiment, the examples described in the above embodiments and optional embodiments may be provided for reference, and will not be described again in the present embodiment.

The various technical features of the above embodiments may be combined arbitrarily. To make the description concise, not all possible combinations of respective technical features in the above embodiments have been described. However, as long as there is no contradiction in the combination of these technical features, they should be considered to be the scope of the present description. The articles "a", "an" and "the" are intended to include the plural forms as well, unless the context clearly indicates otherwise.

The above-mentioned embodiments only express several embodiments of the present disclosure, and their descriptions are more specific and detailed, but cannot be understood as limiting the scope of the patent disclosure. It should be pointed out that, to those ordinary skilled in the art, several modifications and improvements may also be made without breaking away from the concept of the present disclosure, and they pertain to the extent of protection of the present disclosure. Therefore, the extent of protection of the disclosure for a patent shall be determined by the terms of the attached claims.

What is claimed is:

1. A hybrid master-slave mapping method, comprising:
    acquiring a current position and a target position of an end point of a robotic arm, wherein the robotic arm comprises a passive arm and a multi-degree-of-freedom parallel platform equipped on an end of the passive arm;
    decomposing a displacement from the current position to the target position into a vertical direction and a horizontal plane, respectively, to obtain a vertical displacement position and a horizontal displacement position;
    determining a first control amount of the multi-degree-of-freedom parallel platform according to the vertical displacement position, and determining a second control amount of the passive arm according to the horizontal displacement position; and
    controlling the multi-degree-of-freedom parallel platform according to the first control amount, and controlling the passive arm according to the second control amount.

2. The method of claim 1, wherein the robotic arm is controlled by a main manipulator; and the acquiring a current position of an end point of the robotic arm comprises:
    recording a position of the end point of the robotic arm as the current position at the moment when the main manipulator starts to be operated.

3. The method of claim 1, wherein the robotic arm is controlled by a main manipulator; and the acquiring a target position of an end point of the robotic arm comprises:
    initializing an initial position of the main manipulator at the moment when the main manipulator starts to be operated;
    after the main manipulator is operated, determining a current position of the main manipulator, and determining a displacement of the main manipulator according to the current position and the initial position of the main manipulator; and
    converting the displacement of the main manipulator into a target displacement of the robotic arm according to a preset displacement scale coefficient, and determining the target position according to the target displacement and the current position of the end point of the robotic arm.

4. The method of claim 3, wherein the preset displacement scale coefficient is adjustable.

5. The method of claim 1, wherein the passive arm comprises a plurality of joints; and the determining a second control amount of the passive arm according to the horizontal displacement position comprises:
    determining at least one target moving joint that generates the displacement within a horizontal plane and at least one target rotating joint that rotates around a vertical direction among the plurality of joints; and
    determining a second control amount of the passive arm according to the horizontal displacement position, wherein the second control amount comprises a movement amount of the target moving joint and a rotating amount of the target rotating joint.

6. The method of claim 5, wherein the determining a second control amount of the passive arm according to the horizontal displacement position comprises:
    obtaining a control amount of the passive arm by inverse solution according to the horizontal displacement position;
    in the case where the control amount of the passive arm obtained by inverse solution is multiple sets of results, determining a set of results of the minimum angle at which the target rotating joint needs to rotate to be the second control amount; and
    in the case where the control amount of the passive arm obtained by inverse solution is one set of results, determining such a set of results to be the second control amount.

7. The method of claim 5, wherein the number of the target moving joint is one, and the number of the target rotating joint is one, wherein the selected one target moving joint is a moving joint which is able to move in the maximum range among moving joints moving in a horizontal plane of the passive arm.

8. The method of claim 1, wherein the passive arm comprises a plurality of joints among which a joint that enables an end point of the robotic arm to generate the displacement in a vertical direction is locked.

9. The method of claim 1, wherein the first control amount of the multi-degree-of-freedom parallel platform is obtained by inverse solution of the vertical displacement position obtained by decomposing the target position of the end point of the robotic arm in the vertical direction.

10. The method of claim 1, wherein the multi-degree-of-freedom parallel platform comprises a static platform, a movable platform and a plurality of telescopic components disposed between the static platform and the movable platform and is able to implement movements of six degrees of freedom in space.

11. The method of claim 10, wherein an ultrasonic detection device is equipped on the movable platform of the multi-degree-of-freedom parallel platform.

12. The method of claim 11, wherein an end point of the ultrasonic detection device is located on an axis of the movable platform of the multi-degree-of-freedom parallel platform.

13. A robotic arm system, wherein the robotic arm system comprises a computer device and a robotic arm comprising a passive arm and a multi-degree-of-freedom parallel platform equipped on an end of the passive arm, and the computer device is electrically connected to the passive arm and the multi-degree-of-freedom parallel platform, respectively, comprises a processor and a storage medium in which a computer program is stored, the computer program being disposed to execute a hybrid master-slave mapping method when run,
    wherein the hybrid master-slave mapping method comprises:
    acquiring a current position and a target position of an end point of a robotic arm;
    decomposing a displacement from the current position to the target position into a vertical direction and a horizontal plane, respectively, to obtain a vertical displacement position and a horizontal displacement position;
    determining a first control amount of the multi-degree-of-freedom parallel platform according to the vertical displacement position, and determining a second control amount of the passive arm according to the horizontal displacement position; and
    controlling the multi-degree-of-freedom parallel platform according to the first control amount, and controlling the passive arm according to the second control amount.

14. The robotic arm system of claim 13, wherein the passive arm comprises a plurality of joints among which a joint that enables an end point of the robotic arm to generate the displacement in a vertical direction is locked.

15. The robotic arm system of claim 14, wherein the joint that enables an end point of the robotic arm to generate the displacement in a vertical direction among the plurality of joints comprises at least one of: a moving joint with the displacement in a vertical direction, or a rotating joint rotating around a non-vertical direction.

16. The robotic arm system of claim 13, wherein the multi-degree-of-freedom parallel platform comprises a static platform, a movable platform and a plurality of telescopic components disposed between the static platform and the movable platform and is able to implement movements of six degrees of freedom in space.

17. The robotic arm system of claim 16, wherein an ultrasonic detection device is equipped on the movable platform of the multi-degree-of-freedom parallel platform.

18. The robotic arm system of claim 13, wherein the robotic arm is controlled by a main manipulator; and the acquiring a current position of an end point of the robotic arm comprises:
    recording a position of the end point of the robotic arm as the current position at the moment when the main manipulator starts to be operated.

19. The robotic arm system of claim 13, wherein the robotic arm is controlled by a main manipulator; and the acquiring a target position of an end point of the robotic arm comprises:
    initializing an initial position of the main manipulator at the moment when the main manipulator starts to be operated;
    after the main manipulator is operated, determining a current position of the main manipulator, and determining a displacement of the main manipulator according to the current position and the initial position of the main manipulator; and
    converting the displacement of the main manipulator into a target displacement of the robotic arm according to a preset displacement scale coefficient, and determining the target position according to the target displacement and the current position of the end point of the robotic arm.

20. A computer device, wherein the computer device comprises a processor and a storage medium in which a computer program is stored, the computer program being disposed to execute a hybrid master-slave mapping method when run,
    wherein the hybrid master-slave mapping method comprises:
    acquiring a current position and a target position of an end point of a robotic arm, wherein the robotic arm comprises a passive arm and a multi-degree-of-freedom parallel platform equipped on an end of the passive arm;
    decomposing a displacement from the current position to the target position into a vertical direction and a horizontal plane, respectively, to obtain a vertical displacement position and a horizontal displacement position;
    determining a first control amount of the multi-degree-of-freedom parallel platform according to the vertical displacement position, and determining a second control amount of the passive arm according to the horizontal displacement position; and
    controlling the multi-degree-of-freedom parallel platform according to the first control amount, and controlling the passive arm according to the second control amount.

* * * * *